United States Patent [19]

Bull

[11] 4,081,634
[45] Mar. 28, 1978

[54] TURN SIGNAL ASSEMBLY SELF-CANCELLING MEANS AND OVERRIDE MEANS

[75] Inventor: Dale L. Bull, Reed City, Mich.
[73] Assignee: Nartron Corporation, Reed City, Mich.
[21] Appl. No.: 730,226
[22] Filed: Oct. 6, 1976

Related U.S. Application Data

[63] Continuation-in-part of Ser. No. 565,480, Apr. 7, 1975, Pat. No. 4,013,850.

[51] Int. Cl.² .................... H01H 3/16; H01H 9/00; B60Q 1/00
[52] U.S. Cl. .............. 200/61.27; 200/61.34; 200/61.35; 200/61.54
[58] Field of Search ........... 200/61.27, 61.3, 61.34, 200/61.35, 61.54

[56] References Cited

U.S. PATENT DOCUMENTS

| | | | |
|---|---|---|---|
| 3,809,833 | 5/1974 | Miller et al. | 200/61.27 |
| 4,013,850 | 3/1977 | Bull | 200/61.27 |

*Primary Examiner*—James R. Scott
*Attorney, Agent, or Firm*—Lon H. Romanski

[57] ABSTRACT

A manually actuatable electrical switch assembly, employable as, for example, a turn signal and emergency warning switch assembly for automobiles, trucks or the like, has a main body or housing carrying electrically openable circuit means the opening of which is controlled by manually rotatable handle means selectively manually positionable to any of a plurality of selected positions to thereby open and close related electrical circuit means leading to associated sensory warning means; motion transmitting lever means, carried by an adapter body which is operatively secured as between the main body or housing and a cooperating vehicular steering column housing, is effective to cooperate with first abutment means, moved in response to turning of the associated vehicular steering wheel, to transmit a force to second abutment means, operatively carried by the handle means, in order to thereby be effective to at least at times move said handle means from a previously selected position to a position which might be considered as a null position; and escapement-like means are provided whereby the first and second abutment means can engage and move past each other without causing the handle means to move from a previously selected position if such handle means is manually held in such selected position.

12 Claims, 20 Drawing Figures

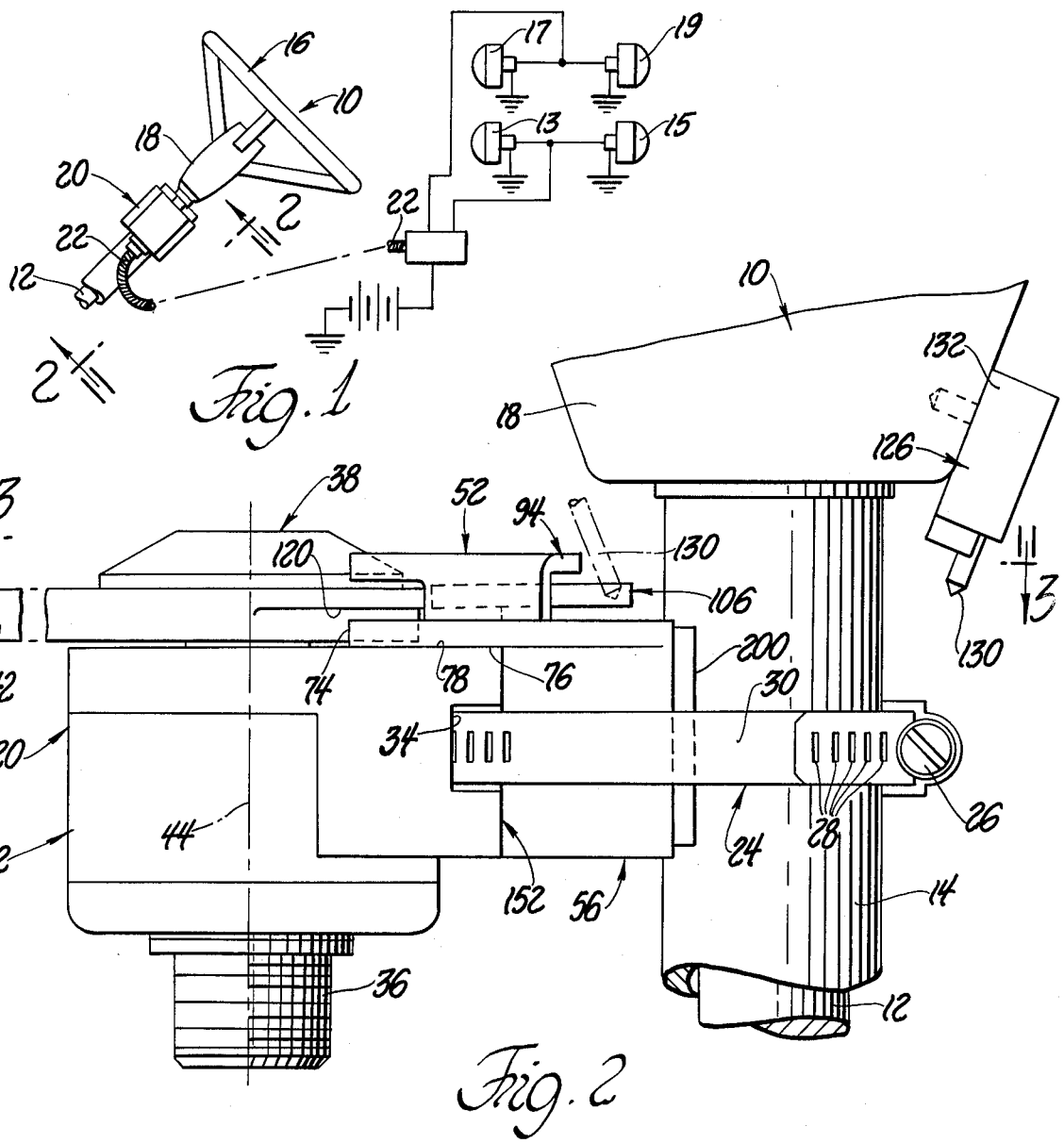
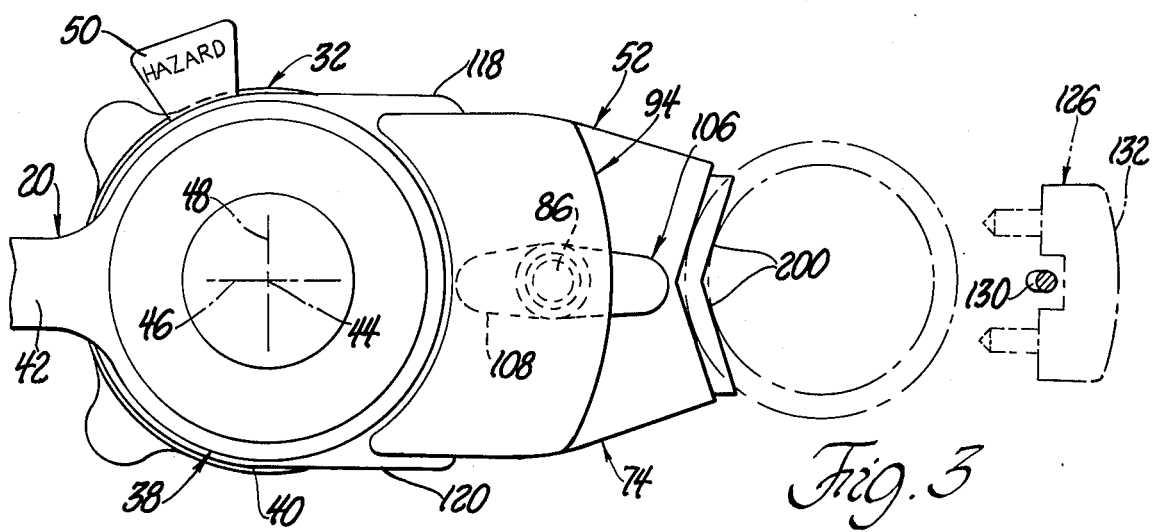

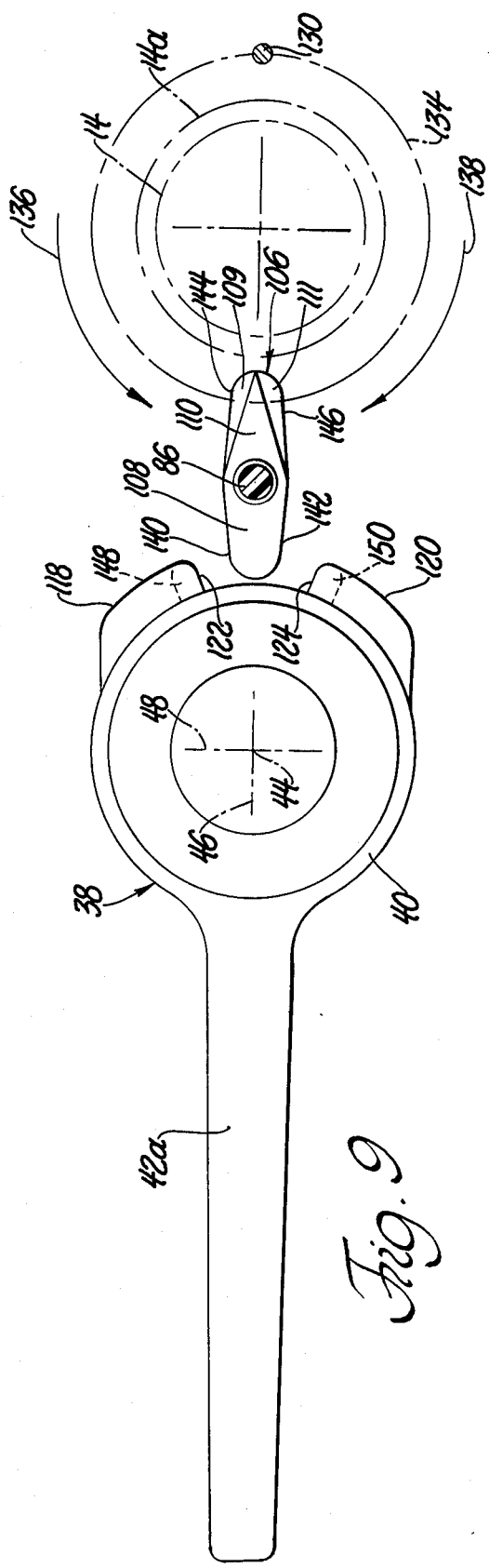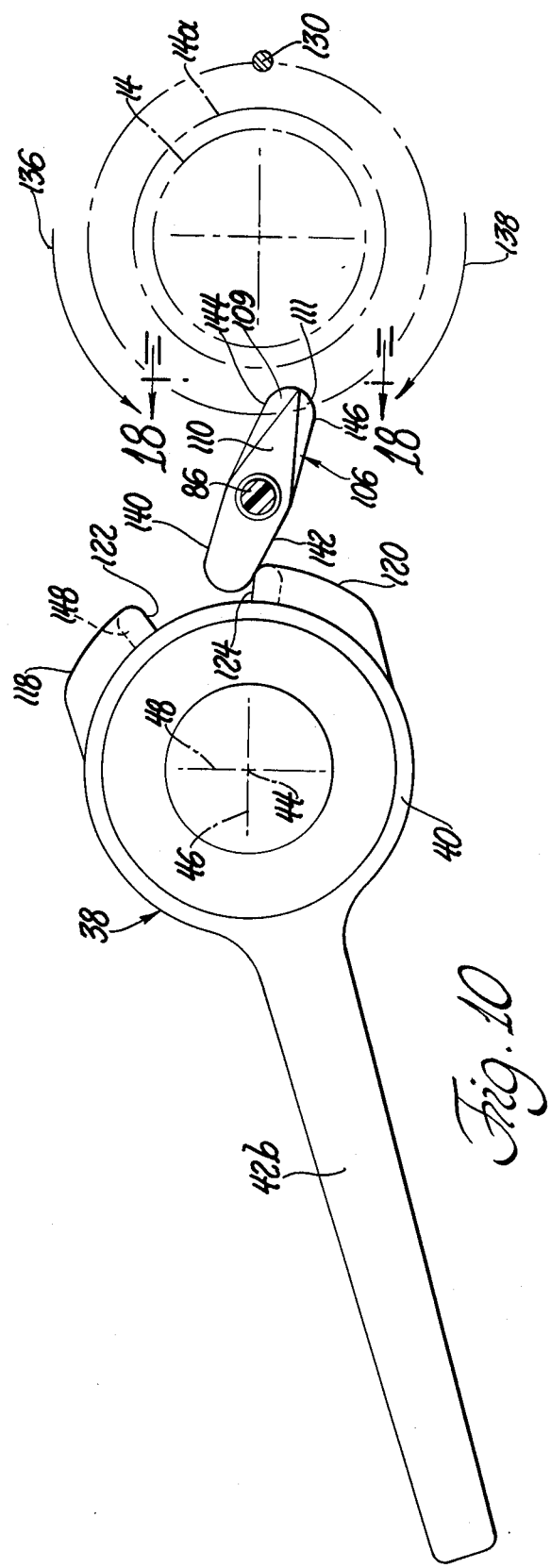

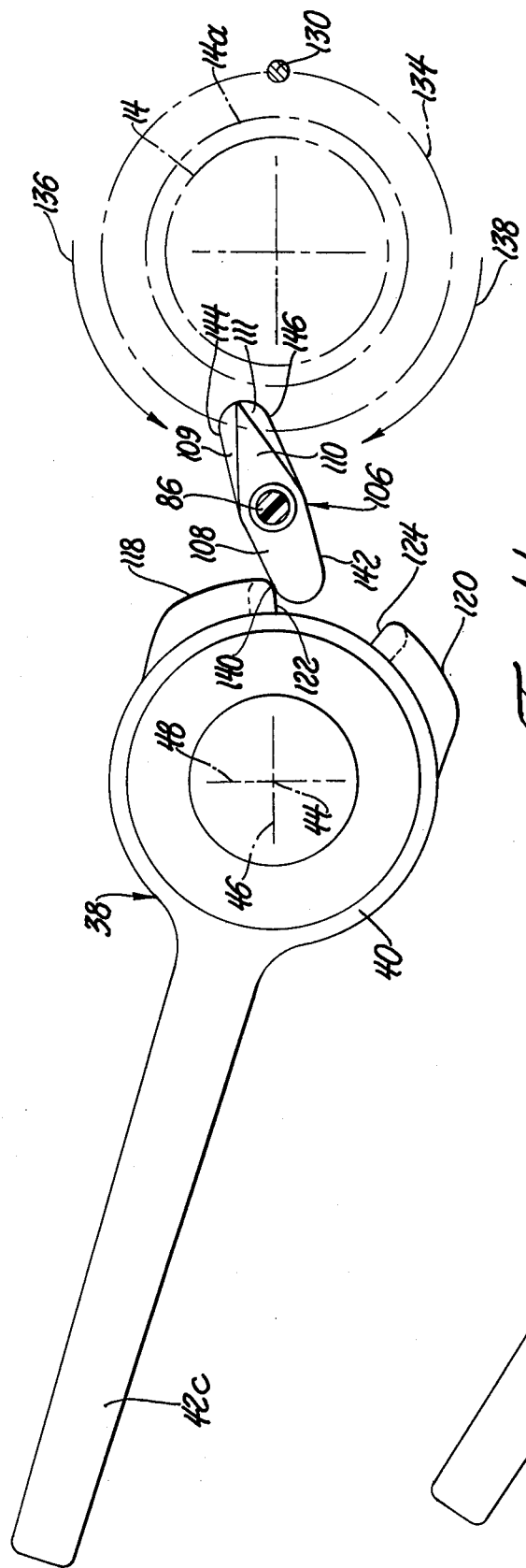

TURN SIGNAL ASSEMBLY SELF-CANCELLING MEANS AND OVERRIDE MEANS

RELATED APPLICATION

This is a continuation-in-part of my copending application Ser. No. 565,480 filed Apr. 7, 1975 now U.S. Pat. No. 4,013,850 for: "Turn Signal Assembly and Self-Cancelling Means".

BACKGROUND OF THE INVENTION

Generally, in the field of turn signal switch assemblies, the prior art has provided two general types. The first of such types is the self-cancelling type which is usually employed in automobile applications. Such self-cancelling turn signal switch assemblies, when assembled to the vehicle, are generally contained within the steering column housing situated about and enclosing the vehicular steering gear shaft which, in turn, is connected to an associated operator-controlled steering wheel and to steering linkage means leading to the vehicular ground engaging steerable wheels. The second of such types is the non-self-cancelling type which is usually employed as in both military and commercial truck applications. Such non-self-cancelling turn signal switch assemblies, when assembled to the vehicle, are generally strapped or otherwise suitably secured to the exterior of the steering gear shaft column housing as to be mounted completely externally of such shaft column housing.

The truck industry, generally, desires such turn signal switch assemblies to be thusly externally mounted in that there are appreciable cost savings arising out of, for example: (a) simplicity in the original manufacturing of the turn signal assembly; (b) no requirement to enlarge the steering shaft housing to accommodate the mounting of the switch assembly therein; (c) ease and simplicity of assembling the turn signal switch assembly to the steering shaft housing; and (d) ease of repairing and/or replacing the turn signal switch assembly should such be made necessary as by some internal failure.

However, as a consequence of employing such non-self-cancelling turn signal switch assemblies an obvious shortcoming results. That is, the truck operator must always remember to manually reset the turn signal switch assembly to its neutral or null position after the truck has completed a turning operation. Unfortunately, the resetting of the turn signal switch assembly is frequently forgotten and such often leads to the creation of a dangerous driving condition in that operators of other vehicles in the same vicinity are mislead to believe that the subject truck is preparing to undergo a turning operation instead of actually having completed a turning operation. Such misinformation conveyed to such other operators may cause them to take action which may be contrary to the safety of all concerned.

Accordingly, the invention as herein disclosed and described is directed primarily to the solution of the problems attendant the non-self-cancelling turn signal assembly and to enable such turn signal assembly to be, in fact, employable as a self-cancelling turn signal assembly.

SUMMARY OF THE INVENTION

According to the invention, a turn signal switch assembly, having a body or housing assembly mountable to the shaft housing of a vehicular steering gear and shaft assembly to which an operator controlled steering wheel is secured, has a motion transmitting member interposed generally between the manually positionable selector lever means of the switch assembly and the shaft housing, the motion transmitting member is adapted to at times be engaged by actuating means movable in conjunction with rotation of said steering wheel so as to move the lever means from a previously selected position or condition of operation and to a neutral or null position or condition of operation, and escapement means permit the actuating means movable in conjunction with the rotation of the steering wheel to engage and move past the motion transmitting member without moving the lever means from any said selected position.

Various general and specific objects and advantages of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views:

FIG. 1 is a side elevational view of a vehicular steering column assembly with an externally mounted turn switch assembly suitable secured thereto;

FIG. 2 is an enlarged fragmentary elevational view taken generally on the plane of line 2—2 of FIG. 1 and looking in the direction of the arrows;

FIG. 3 is a view taken generally on the plane of line 3—3 of FIG. 2 and looking in the direction of the arrows with the associated steering column housing means illustrated in phantom lines;

FIGS. 9, 10, 11 and 12 are each simplified views of the structure shown in FIG. 3 and respectively illustrating different operational modes;

DETAILED DESCRIPTION OF THE PREFERRED EMBODIMENTS

Figure 4:
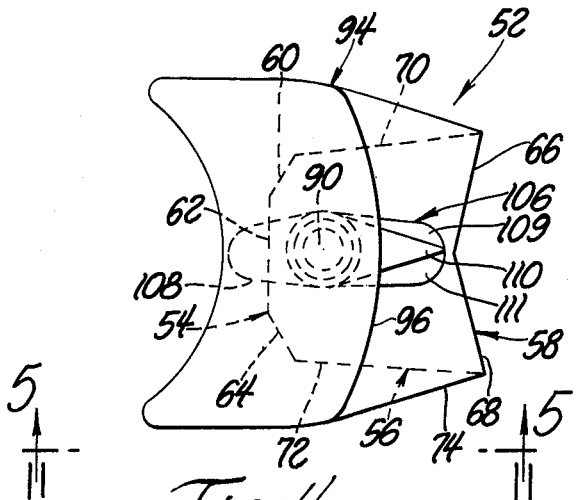
FIG. 4 is a top plan view of one of the sub-assemblies of FIGS. 2 and 3.

Referring now in greater detail to the drawings, FIG. 1 illustrates vehicular steering means 10 shown as comprising a rotatable steering shaft 12, a steering column housing (sometimes referred to as a steering shaft housing) 14, and an operator controlled steering wheel assembly 16. Hub portion 18 of steering wheel 16 is, as is well known in the art, operatively connected to the upper end of steering shaft 12 while the lower end of shaft 12 is operatively connected to suitable motion transmitting and linkage means leading to the vehicular ground engaging steering wheels (not shown). Accordingly, as is well known, rotation of control steering wheel 16 causes corresponding rotation of shaft 12 which, in turn, results in the vehicular steerable ground engaging wheels being correspondingly turned as to cause such associated vehicle to undergo a turning operation.

A turn signal switch assembly 20 is shown mounted on and carried by the housing 14. As generally depicted at 22, suitable related electrical conductor means 22, leading from switchable means or members within assembly 20 and interconnecting the switching assembly to related electrically energizable means as well as electrical power source means may be, if desired, exposed to view.

FIG. 2, an enlarged fragmentary elevational view taken on the plane of line 2—2 of FIG. 1, illustrates the turn signal switch assembly 20 as being secured to the column housing portion 14 of the steering means 10, as by adjustable clamping means which, in the form illustrated, is an adjustable strap means 24 the clamping length of which is determined as by screw means 26 threadably cooperating with indentations or slots 28 within the strap 30. The precise configuration of such clamping means forms no part of this invention and any such means, many of which are well known in the art, may be employed.

Generally, as shown in FIGS. 2 and 3, the switch assembly 20 may be comprised of a main body or housing means 32 having suitable aperture means 34, for the reception therethrough of the clamping means 24, and a suitable connector 36, if desired, for accommodating the mechanical locking thereto of related electrical conductor or harness means as generally depicted at 22 of FIG. 1. Manually actuatable handle means 38 situated generally atop housing 32 is depicted as being comprised of a handle body portion 40 and, preferably, an integrally formed handle extension portion 42. Generally, the handle means 38 is rotatable about centerline 44, whih is viewed as the intersection of centerlines 46 and 48 of FIG. 3, to and from various positions and modes of operation. An actuatable abutment member 50 may be depressed in order to rotate the lever or handle means 38 to a mode of operation wherein it is desired to signal, for example, a hazard condition to others in the vicinity. Although not believed to be necessary to the understanding of the invention, reference is hereby made to U.S. Pat. No. 3,809,833 granted May 7, 1974, for a complete and detailed description as to how, by way of example and not of limitation, the internal switching structure of the switch assembly 20 may be comprised and as to how, also by way of example and not of limitation, how the member 50 and related structure may be arranged as illustrated, for example, by elements 334, 344, 336, 338, 340 and 348 of FIGS. 1 and 2 of said U.S. Pat. No. 3,809,833.

As also illustrated in FIGS. 2 and 3, adapter means 52 is generally interposed between the switching assembly 20 and the related mounting means which, in the case illustrated, comprises the steering shaft housing 14 or the functional equivalent thereof.

With reference to FIGS. 4, 5, 6, 7 and 8, which illustrate the adapter means 52 in greater detail, it can be seen that the adapter means 52 is shown as comprising a main body 56 having first and second generally opposed end wall means 54 and 58.

As shown, wall means 54 is preferably comprised of wall sections or portions 60, 62 and 64 (with portion 60 and 64 being inclined with respect to portion 62 as viewed in FIG. 4) while wall means 58 is preferably comprised of wall portions 66 and 68 inclined with respect to each other. The wall means 58 thereby defines mounting surface means whereby the adapter body means 56 may be mounted as to the steering shaft housing 14 while the wall means 54 defines a mounting surface means against which the body or housing 32 of turn signal switch assembly 20 may be operatively mounted. As seen in each of FIGS. 4, 5, 6, 7 and 8, wall sections 60 and 66 are each joined to side wall 70 while wall sections 64 and 68 are each joined to an opposite side wall 72.

Preferably, the upper end of adapter body 56 is provided with an integrally formed laterally extending flange portion 74 an under-surface 76 of which, as shown in FIG. 2, rests atop a cooperating upper surface means 78 of turn signal switch housing means 32. A second lower disposed flange or abutment portion 80 is preferably integrally formed with body 56 and an upper surface 82 thereof is adapted to coact with means associated with switch housing 32 in a manner to be described.

Figure 6:
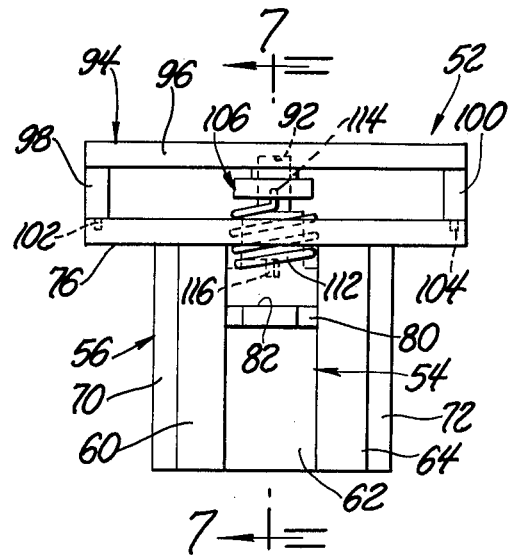
FIG. 6 is an end-elevational view taken generally on the plane of line 6—6 of FIG. 5 and looking in the direction of the arrows.
Figure 5:
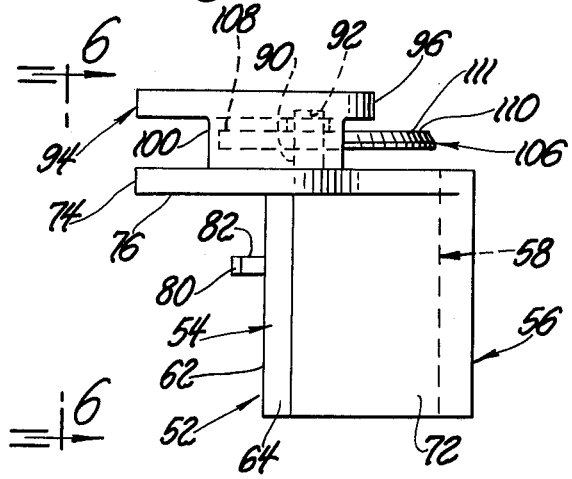
FIG. 5 is a side elevational view taken generally on the plane of line 5—5 of FIG. 4 and looking in the direction of the arrows.
Figure 7:
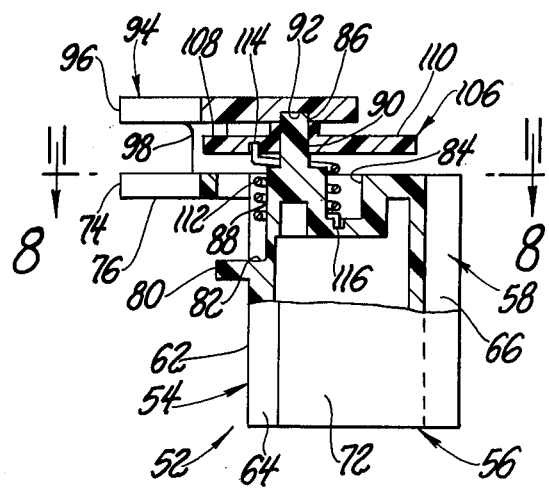
FIG. 7 is a vertical cross-sectional view, with portions shown in side elevation, taken generally on the plane of line 7—7 of FIG. 6 and looking in the direction of the arrows.
Figure 8:
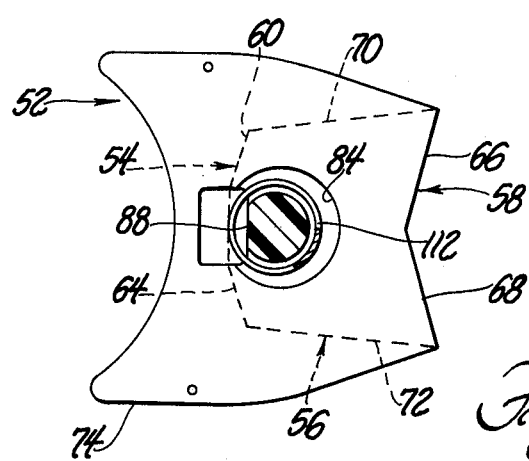
FIG. 8 is a view taken generally on the plane of line 8—8 of FIG. 7 and looking in the direction of the arrows.

Even though the adapter body 56 may be constructed in any suitable manner, in the preferred embodiment shown, the adapter body 56 is integrally molded of plastic material, such as, for example, thermoplastic carbonate-linked polymers. As illustrated in FIGS. 6, 7 and 8 an annular recess 84 is formed generally in the upper surface of body 56 along with a generally centrally located upwardly extending member 86 which thereon defines a first lower relatively enlarged spring locator portion 88 and an upper relatively smaller diameter pivot or journal portion 90. As shown in each of FIGS. 5, 6 and 7 the upper end of pivot portion 90 is preferably closely received within a cooperating aperture or recess 92 formed in the underside of a bridging-like cover member or support 94. Although not essential to the practice of the invention, in the preferred embodiment such a coverlike member 94 is provided and comprises a generally laterally extending bridge-like portion 96 with downwardly depending leg portions 98 and 100 at opposite ends thereof. Further, in the preferred embodiment, pin portions 102 and 104 are respectively formed on leg portions 98 and 100 as to be, when assembled, received within cooperating apertures formed in flange 74 where they may be suitably secured as by, for example, cementing or heat fusion.

A motion transmitting lever 106, is provided with an aperture for pivotal mounting on and about journal or pivot pin 90. Lever means 106, comprised of lever arms 108 and 110, is operatively connected to related spring means 112 as to normally seek a position as generally depicted in FIGS. 3, 4, 5, 6 and 7. That is, for example, lever arm 108 may be operatively connected to a moveable one end 114 or torsion spring 112 which, in turn, has its other end 116 secured against movement as by a receiving aperture formed in body 56.

As partly illustrated in FIGS. 2 and 3 and as further illustrated in FIGS. 9, 10, 11 and 12, the body 40 of lever means 38 is provided with generally laterally extending protrusions or abutment means 118 and 120 respectively provided with abutment surfaces 122 and 124 generally opposed to each other and spaced from each other. Such abutment means 118 and 120 rotate with body 40 and, in so doing, pass generally between transverse bridging portion 96 of cover-like member 94 and the top of flange 74 of the associated body 56 and as to be in a plane or path of travel whereby abutment surfaces 122 and 124 are in functional juxtaposition to the lever arm 108 of lever means 106.

Figure 15:
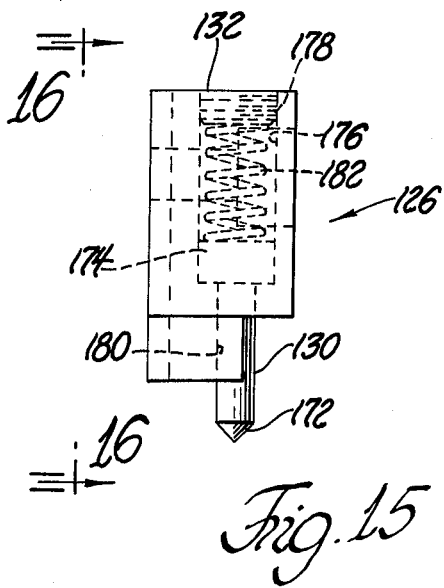
FIG. 15 is an enlarged side view, with portions in hidden line, of the actuator means shown in FIG. 2.
Figure 16:
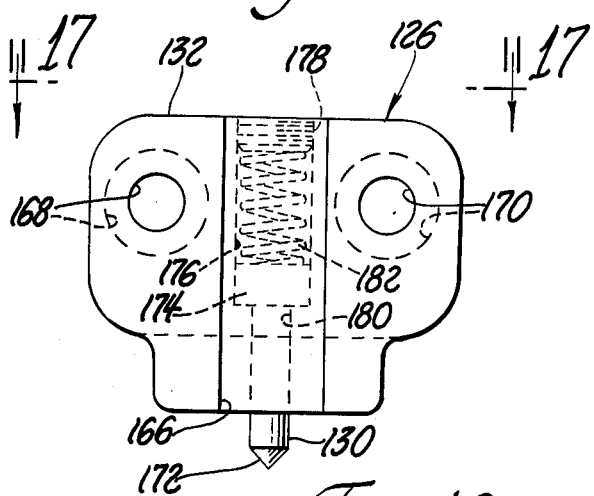
FIG. 16 is an elevational view, of the actuator means of FIG. 15, taken generally on the plane of line 16—16 of FIG. 15 and looking in the direction of the arrows.

Referring to FIGS. 2 and 3, it can be seen that the steering wheel hub 18 is provided with an actuator body and pin assembly 126 secured to the hub 18, as by screws 128, for rotation therewith. The body and pin assembly, also shown in FIGS. 15 and 16 will be subsequently described. At this point, it will suffice to say that pin 130, carried by body 132 rotates with hub 18 in a path generally passing through arm 110 of lever 106 as depicted in FIG. 2.

In each of FIGS. 9, 10, 11 and 12, the effective circular centerline 134 indicates the path of movement of pin 130, at an elevation generally coplanar with arm portion 110 of lever 106, as the pin 130 is rotated 360° due to corresponding rotation of the steering wheel 16 and hub 18. Further, in each of FIGS. 9, 10, 11 and 12, arrows 136 and 138 respectively indicate the direction of rotation of steering wheel 16 and hub 18, along with the direction of movement of actuator means or pin 130, for affecting left and right turns of the associated vehicle.

In FIG. 9, the handle means 38 of the turn signal switch assembly 20 is shown in its neutral position as generally depicted at 42a. This is the position the turn signal switch assembly 20 assumes when the vehicle operator is neither anticipating nor causing the associated vehicle to undergo a turning operation. It should be noted that in the event the steering wheel 16 is turned more than 180° in the directions indicated by either 136 or 138 pin or actuator means 130 will contact lever means 106 and cause the lever means to rotate either clockwise or counter-clockwise about pivot 86. However, in so doing, the swinging end of lever arm 108 swings as to miss engaging either abutment surfaces 122 or 124, as the case may be. Accordingly, it can be seen that whenever lever or arm means 38 is in a neutral position no amount of rotation of steering wheel means 16 will result in any motion of such turn signal arm means 38.

If it is now assumed that the vehicle operator wishes to make a left turn and to indicate his intentions to other vehicle operators in the vicinity, as by the intermittent energization of the left front and left rear vehicle indicator lamps 13 and 15 of FIG. 1, the operator rotates the turn signal arm means 38 to the position generally depicted at 42b of FIG. 10. It will be noted that in such a condition of operation abutment means 120 has also been correspondingly rotated counter-clockwise about axis 44 as to thereby cause abutment surface 124 to engage side 142 of lever arm 108 and rotate lever means 106, against the resilient resistance of spring means 112, clockwise about pivot means 86 to the position generally depicted in FIG. 10. It can be seen that if, after movement of lever means 38 to position 42b, the steering wheel means 16 and actuator means 130 are turned in the left-turn direction of arrow 136, actuator 130 will strike edge or side 144 of lever arm 110 and, with continued motion in direction 136, rotate lever means 106 in the clockwise direction about pivot 86, further from that shown in FIG. 10, until actuator 130 passes by the further-rotated end of lever arm 110. Once the actuator 130 thusly passes lever arm 110, spring means 112 resiliently urges and returns lever means 106 to the position shown in FIG. 10. It should be observed that such further clockwise rotation of lever means 106 as occasioned by the actuator 130 in no way alters the previously manually selected position of switching lever or arm means 38 because, during such time, lever arm 108 swings free of abutment means 118.

Still referring to FIG. 10, let it now be assumed that instead of wheel assembly 16 and actuator 130 being rotated in the left-turn direction of arrow 136, such are being rotated in the right-turn direction of arrow 138. Under such assumed condition it can be seen that actuator means 130 will strike or engage or edge 146 of lever arm 110 and that with further movement of the steering wheel 16 and actuator means 130 in such a direction, the actuator means 130 will forcibly rotate lever means 106 in a counter-clockwise direction about pivot means 86. In so doing, side or edge 142 of lever arm 108 reacts against abutment surface means 124 and abutment means 120 thereby forcing control arm means 38 in the clockwise direction about its axis 44. The turn signal switch control arm means 38 will thusly rotate about axis 44 until it reaches its neutral position as depicted at 42a of FIG. 9, at which position lever means 106 becomes incapable of exhibiting any further moving force against control arm means 38. It should be mentioned that there may well be means associated with or comprising the overall switch assembly 20 which serve to tend to hold control arm means 38 in any or all of its plurality of positions including its neutral position. Such means, as is well known in the art, may take the form of detent-like means which not only serve to provide a degree of resilient resistance to the movement of the control arm means 38 from a selected position but also provide a resilient force tending to move the control arm means into the next selectable position as the control arm means is being moved toward and nearly approaches such next selectable position.

If it is now assumed that the vehicle operator wishes to make a right turn and to indicate his intentions to other vehicle operators in the vicinity as by the intermittent energization of the right front and right rear vehicular indicator lamps 17 and 19 of FIG. 1, the operator rotates turn signal arm means 38 to the position generally depicted at 42c of FIG. 11. It will be noted that in such a condition of operation abutment means 118 has also been correspondingly rotated clockwise about axis 44 as to thereby cause abutment surface 122 to engage side or edge 140 of lever arm 108 and rotate lever means 106, against the resilient resistance of spring 112, counter-clockwise about pivot means 86 to the position generally depicted in FIG. 11. It can be seen that if, after movement of control lever means 38 to position 42c, the steering wheel means 16 and actuator means 130 are turned in the right-turn direction of arrow 138, actuator 130 will strike or engage side or edge 146 of lever arm 110 and, with continued motion in direction 136, rotate lever means 106 in the counter-clockwise direction about pivot 86, further from that shown in FIG. 11, until actuator 130 passes by the further-rotated end of lever arm 110. Once the actuator 130 thusly passes 110, spring means 112 resiliently urges and returns lever means 106 to the position shown in FIG. 11. It should be observed that such further counter-clockwise rotation of lever means 106 as occasioned by the actuator 130 in no way alters the previously manually selected position of selector lever means 38 because, during such time, lever arm 108 swings free of abutment means 120.

Still referring to FIG. 11, let it now be assumed that instead of wheel assembly 16 and actuator means 130 being rotated in the right-turn direction of arrow 138, such are being rotated in the left-turn direction of arrow 136. Under such assumed condition it can be seen that actuator means 130 will strike or engage side or edge 144 of lever arm 110 and that with further movement of the steering wheel 16 and actuator means 130 in such a direction, the actuator means 130 will forcibly rotate lever means in a clockwise direction about pivot means 86. In so doing, side or edge 140 of lever arm 108 reacts against abutment surface means 122 and abutment means 118 thereby forcing control or selector arm means 38 in the counter-clockwise direction about its axis 44. The turn signal selector lever means 38 will thusly rotate about axis 44 until it reaches its neutral position as depicted at 42a of FIG. 9, at which position lever means 106 becomes incapable of exhibiting any further moving force against selector lever means 38.

If it is now assumed that the vehicle operator wishes to indicate to others in the vicinity a hazard condition as by the intermittent flashing or energization of both front indicator lamps 13 and 17 and both rear indicator lamps 15 and 19, the operator will rotate selector lever means 38 clockwise about the axis 44 until such means 38 attain the position generally depicted at 42d of FIG. 12. In so doing, it should be noted that abutment means 118 has likewise been rotated clockwise to the position indicated in FIG. 12 thereby engaging lever arm 108 of lever means 106 and rotating lever means 106, counter-clockwise about support pivot means 86, to the position depicted in FIG. 12.

It should be noted in comparing FIGS. 11 and 12 that in FIG. 12 the selector lever means 38 and abutment means 118 have been rotated further than the selector lever means 38 and abutment means in FIG. 11 and that in FIG. 12 lever means 106 has also been rotated further than lever means 106 in FIG. 11. As a consequence of such comparatively further rotation of lever means 106, the swingable end of lever arm 110 is moved to a position whereby even 360° rotation of steering wheel assembly 16 and actuator means 130, in either of the directions represented by 136 or 138, will not cause operational engagement as between actuator 130 and lever arm 110. In the remote event some engagement does occur, it will only cause the further counter-clockwise rotation of lever means 106 from the position shown in FIG. 12, and, obviously, such further rotation will not effect the position of selector arm means 38.

Figure 13:
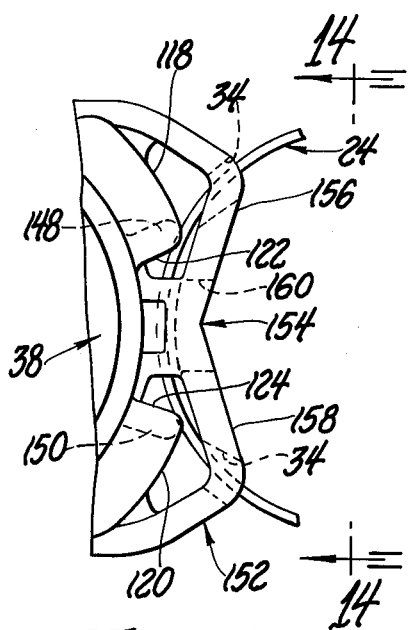
FIG. 13 is a slightly enlarged fragmentary top plan view of the turn signal switch assembly of FIG. 3.
Figure 14:
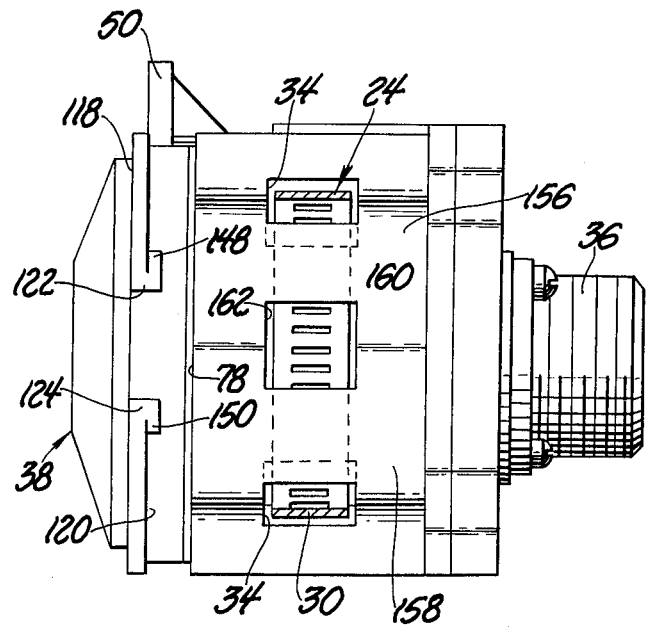
FIG. 14 is an end elevational view taken generally on the plane of line 14—14 of FIG. 13 and looking in the direction of the arrows.

FIG. 13 illustrates in slightly enlarged fragmentary view the top plan view of the switching assembly 20 shown in FIGS. 1, 2 and 3, while FIG. 14 is a view taken generally on the plane of line 14—14 of FIG. 13. In FIGS. 13 and 14 it can be seen that flanges 118 and 120 may be provided with enlarged generally downwardly depending integrally formed portions 148 and 150, respectively, which serve to increase the surface area of abutment surface means 122 and 124, respectively, as well as to add strength to the abutment means 118 and 120.

Further, as shown in both FIGS. 13 and 14, end 152 of switch housing 32 may be provided with mounting surface means 154 comprised as of surface portions 156 and 158 which are inclined with respect to each other. Also, preferably, a cut-out or aperture 160 is formed generally medially of surface means 154 with such aperture 160 having an upper end surface 162. In the embodiment and arrangement disclosed by FIGS. 1-12, the cancelling means 52 is generally vertically interlocked with turn signal switch assembly 20 as by means of the lower surface 76 of flange 74 resting against the upper surface 78 of housing 32 while the upper surface 82 of tab or flange 80 is held against upper edge or surface 162 of aperture 160 of FIG. 14. This arrangement enhances the relative stability of the assembled assemblies 20 and 52 when collectively secured as to the column housing 14.

Referring to FIGS. 1, 15, 16 and 17 the actuator means 126 is illustrated as comprising main body means 132 which, preferably, has its inner surface 164 stepped as at 166 to thereby be able of serving as keying surface means for cooperation with functionally similar means carried by the steering wheel hub 18. As shown, a pair of recesses and clearance apertures 168 and 170 are formed in body means 132 for the reception therethrough of screws 128 by which such actuator assembly 126 may be detachably secured as to the wheel hub means 18. The pin 130 has its extending end suitably contoured as at 172 while its inner end is provided with an enlarged head-like portion 174 which is slidably received as within a cylindrical chamber 176 the upper end of which may be closed as by threaded plug means 178. While head portion 174 is received in chamber 176, the shank portion of pin 130 is similarly slidably received in axially aligned passage 180. A spring 182, situated in chamber 176, continually resiliently urges head 174 and pin 130 downwardly to the position illustrated in FIG. 15.

As shown by FIGS. 2-14, mounting surfaces 156 and 158 of housing 32 are adapted to receive thereagainst the surfaces 60, 64 of cancellation means body 56 when operatively connected to each other. Further, surfaces 66 and 68 are adapted to receive thereagainst the associated support structure as, for example, column housing 14. However, surfaces 66 and 68 may also be provided with suitable shimming means 200 so as to accommodate, for example, a housing 14 of relatively smaller diameter while still enabling the accommodation, as either with a thin shim or no shim at all, a housing of relatively larger diameter as depicted at 14a. This, as a practical matter might be highly desirable where, for example, the radius of rotation of actuator pin 130 must be of a certain magnitude. In such situation where the said radius of rotation cannot be altered and such radius would cause the actuator pin 130 to engage lever means 106 at a point too close to the axis of pivotal rotation of lever means 106, shims such as at 200 may be employed to in effect increase the distance between the axis of pivotal rotation of lever means 106 and the axis of the radius of rotation of pin 130.

Referring in particular to FIGS. 4,5,9,10,11,12,15,16, and 18, it can be seen that arm 110 of lever 106 is provided with suitably contoured ramp-like surfaces 109 and 111 which are inclined with respect to both the horizontal and vertical. Such surface means 109 and 111 cooperate with the actuator means 126 to define, in effect, escapement means.

That is, let it be assumed that the turn signal switch assembly has been actuated as to the position depicted in FIG. 10 indicating that the vehicle operator was about to cause the vehicle to undergo a left turn. If at this time the situation arises that the vehicle operator desires the left-turn mode of the turn signal assembly to continue and yet finds it necessary to rotate steering wheel 16 in the right turn direction, which would normally cause the turn signal lever to return to the null position 42a from the selected left turn position 42b, the invention enables the operator to manually hold lever 42 in its selected position 42b (thereby maintaining the energization of the left turn sensory warning devices) while rotating steering wheel 16 in the right turn direction.

Figure 18:
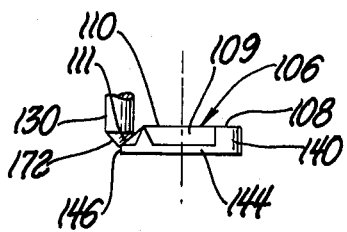
FIG. 18 is a view taken generally on the plane of line 18—18 of FIG. 10 and looking in the direction of the arrows.
Figure 17:
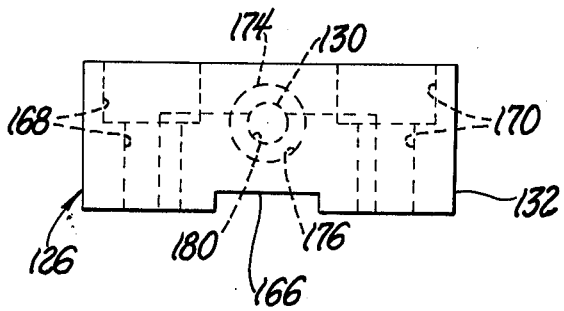
FIG. 17 is a view taken generally on the plane of line 17—17 of FIG. 16 and looking in the direction of the arrows.

With reference to FIG. 18, it can be seen that as steering wheel 16 is rotated in the right turn direction, actuating pin 130 approaches side 146 of lever arm 110 and engages its contoured end 172 thereagainst. Normally, as previously described, continued rotation of steering wheel 16 in the right turn direction would cause lever 106 to be rotated counter-clockwise (as viewed in FIG. 10) resulting in lever 42 being rotated to the position depicted in FIG. 9. However, when such continued rotation of steering wheel 16 is accompanied by the vehicle operator manually holding lever 42 in its selected position of 42b the camming action of coacting surfaces 172 and 111 cause an upwardly directed force of sufficient magnitude to overcome the preload of spring 182 thereby resulting in pin 130 moving generally upwardly as to pass or ride over lever arm 110 and its inclined surfaces 109 and 111. The same occurs, of course, if the selector lever 42 is initially positioned in the right turn position 42c of FIG. 11 and manually held there as the steering wheel 16 is rotated in left turn direction with the exception, of course, that in such a situation the pin 130 would first engage side 144 and coact first with contoured inclined surface 109 of lever arm 110 in its traversing of such arm 110. Obviously, when the lever 42 is not manually held in a selected position the force of the preload in spring 182 is of such a magnitude as to cause pin 130 to return the turn signal switch assembly to its null position instead of deflecting upwardly and over arm 110 of lever 106.

Figure 19:
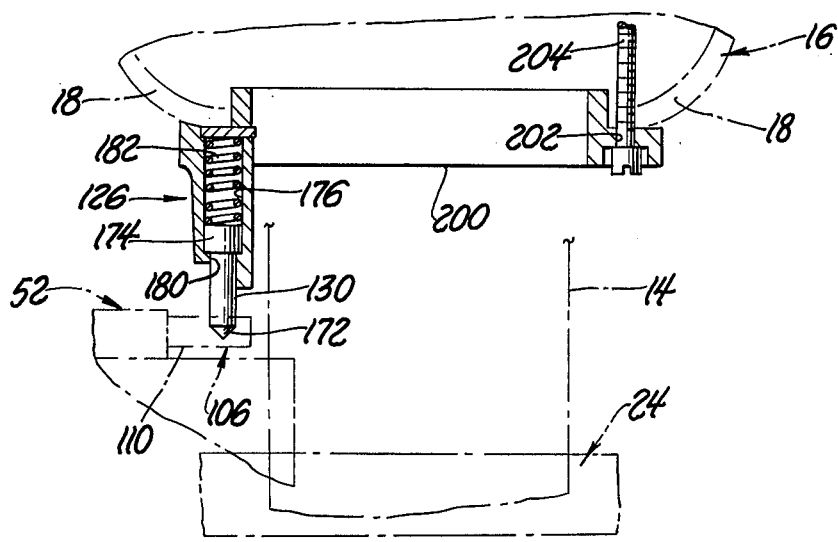
FIG. 19 is a fragmentary view of another embodiment of the invention illustrated in axial cross-sectional.

FIG. 19 illustrates another embodiment of the actuator means; all elements which are like or similar to those of the preceding Figures are identified with like reference members. In the embodiment of FIG. 19, the actuator means 126 is illustrated as comprising an annular or ring body 200 provided with a chamber 176 and guide passage 180 for the slidable reception therein of pin 130. A plurality of clearance passageways, one of which is shown at 202, enable the securing of such body 200 to the steering wheel assembly 16 as by respective screws, one of which is shown at 204, thereby, for example, causing body 200 to appear to be a downward continuation of steering wheel assembly hub portion 18. The operation of the pin 130, lever 106 and spring 182 of FIG. 19 is as that previously described with respect to the preceding Figures.

Figure 20:
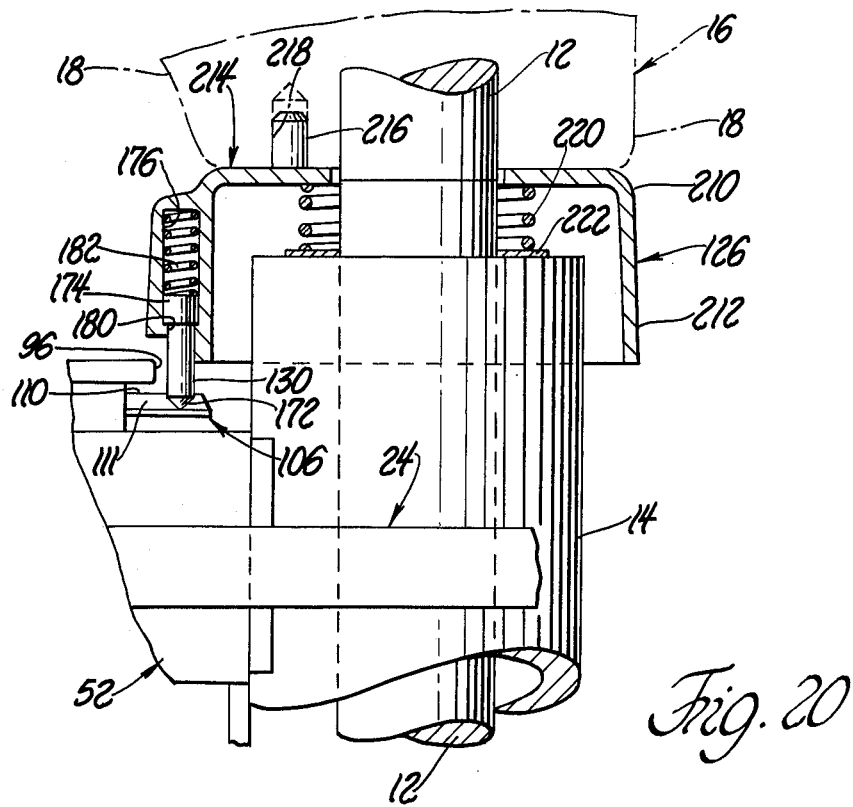
FIG. 20 is a view similar to FIG. 19 and illustrating still another embodiment of the invention.

FIG. 20 illustrates another embodiment of the actuator means 126. Those elements which are like or similar to those of the preceding Figures are identified with like reference numbers. In the embodiment of FIG. 20 the actuator means 126 is illustrated as comprising an inverted cup-like body 210 with an annular depending wall 212 providing chamber 176 and passage 180 for the reception therein of pin 130. The transverse wall 214 of cup body 210 preferably carries a plurality of locating pins, one of which is shown at 216, which are closely received within cooperating apertures or recesses 218 formed as within the hub portion 18 of steering wheel assembly 16. As can be seen, the body 210 may be axially retained against hub portion 18 of steering wheel 16 as by an annular spring 220 situated generally about shaft 12 and axially confined between cup wall 214 and the top of column housing 14. If desired, suitable washer or thrust bearing means may be provided at the ends of spring 220 as typically depicted at 222. The operation of the pin 130, lever 106 and spring 182 of FIG. 20 is as that previously described with respect to the preceding Figures.

Although only a preferred embodiment and selected modifications of the invention have been disclosed and described, it is apparent that other embodiments and modifications of the invention are possible within the scope of the appended claims.

I claim:

1. A turn signal switch and assembly for an associated vehicle having manually controlled vehicular steering gear means and steering gear column housing means, comprising turn signal switch housing means for enclosing and containing actuatable electrical switching members therein, rotatable selector lever means carried by said switch housing means generally externally thereof, said selector lever means being selectively manually rotatably positionable into a neutral position and any of a plurality of operating positions as to thereby accordingly actuate said switching members within said switch housing means, abutment means operatively carried by said selector lever means as to be situated externally of said switch housing means, motion transmitting means situated generally externally of said switch housing means and having a first portion in operative juxtaposition to said abutment means, said motion transmitting means further comprising a second portion adapted to be at times operatively engaged by actuating means moving in response to indicia of said steering gear means being actuated to steer said associated vehicle in a non-linear path, said actuating means being effective when said selector lever means has been selectively positioned in one of said operating positions corresponding to a left-turn operation of said associated vehicle and when said steering gear means is being actuated in a right-turn direction to engage said motion transmitting means and thereby forcibly cause said motion transmitting means to react against said abutment means to thereby cause said selector lever means to be rotated from said one of said operating positions to said neutral position, and support body means situated externally of said switch housing means, said support body means being separate from said switch housing means and effective to support said motion transmitting means, said support body means comprising first mounting surface means effective for operative mounting engagement with said column housing means externally thereof and second mounting surface means effective for operative mounting engagement with said switch housing means as to thereby position said switch housing means externally and eccentrically of said column housing means, said motion transmitting means and said actuating means cooperatively comprising escapement means enabling said selector lever means to be manually held and maintained in said one of said operating positions even when said steering gear means is actuated in said right-turn direction a distance exceeding that which results in engagement as between said actuating means and said motion transmitting means.

2. A turn signal switch and assembly according to claim 1 and further comprising pivot means carried by said support body means, wherein said motion transmitting means comprises force-transmitting lever means pivotally mounted to said pivot means, and wherein said pivot means has an axis of rotation generally parallel to the axis of rotation of said rotatable selector lever means.

3. A turn signal switch and assembly according to claim 1 wherein said abutment means is formed integrally with said rotatable selector lever means, and wherein said abutment means comprises first abutment surface means and second abutment surface means, said first and second abutment surface means being spaced from each other.

4. A turn signal switch and assembly according to claim 1 wherein said actuating means is effective when said selector lever means has been selectively positioned in another of said operating positions corresponding to a right-turn operation of said associated vehicle and said steering gear means is being actuated in a left-turn direction to thereby engage said motion transmitting means and thereby forcibly cause said motion transmitting means to react against said abutment means to thereby cause said selector lever means to be rotated from said other of said operating positions to said neutral position.

5. A turn signal switch and assembly according to claim 4 wherein said motion transmitting means comprises a lever member, wherein said lever member is engaged and rotated by said abutment means to a further position when said selector lever means is rotated to a third of said plurality of operating positions whereat associated indicating means become effective for signaling a hazard condition, said lever member being effectively held in said further position by said abutment means and being pivotally rotated a distance sufficient as to prevent any operative engagement between said lever-member and said actuating means regardless of said steering gear means being actuated to steer said associated vehicle in a non-linear path.

6. A turn signal switch and assembly according to claim 4 wherein said motion transmitting means comprises a force-transmitting lever member pivotally mounted for rotation about an axis generally parallel to the axis of rotation of said rotatable control lever means, and further comprising spring means operatively connected to said support body and said force-transmitting lever member for urging said force-transmitting lever member to a null position.

7. A turn signal switch and assembly according to claim 1 wherein said support body comprises relatively upper and lower locating surfaces for operative engagement with said switch housing means for thereby affecting relative alignment as between said motion transmitting means and said abutment means.

8. A turn signal switch and assembly according to claim 1 wherein said motion transmitting means comprises a force-transmitting lever member, and wherein said actuating means comprises a resiliently displaceable actuator member abutably engageable with said force-transmitting lever.

9. A turn signal switch and assembly according to claim 8 wherein said actuator member comprises a pin-like member, and further comprising spring means resiliently urging said pin-like member toward one extreme position for assuring said abutable engagement with said force-transmitting lever member upon sufficient actuation of said steering gear means.

10. A turn signal switch and assembly according to claim 9 wherein said force-transmitting lever member comprises a first arm portion normally directed generally toward said selector lever means and a second arm portion normally directed generally away from said selector lever means, said first arm portion being adapted for operative engagement with said abutment means carried by said selector lever means and said second arm portion being operatively engageable with said pin-like member, said second arm portion comprising contoured camming surface means effective for at times engaging said pin-like member and causing axial displacement of said pin-like member against the resilient resistance of said spring means.

11. A turn signal switch and assembly according to claim 10 and further comprising pivot means carried by said support body means, wherein said force-transmitting lever member is pivotally mounted to said pivot means, wherein said pivot means has an axis of rotation generally parallel to the axis of rotation of said rotatable selector lever means, and wherein said pin-like member has an axis of displacement generally parallel to said axis of rotation of said pivot means.

12. The combination of vehicle steering gear means, a manually positionable steering wheel means operatively connected to said steering gear means, steering gear housing means enclosing at least a portion of said steering gear means, a vehicular turn signal switch assembly for causing an indication of the intended direction of travel of said vehicle, said turn signal switch assembly comprising switch housing means totally enclosing related actuatable electrical switching elements which when actuated in a preselected manner serve to complete related electrical circuit means leading to associated sensory warning devices, selector lever means carried by said switch housing means generally externally thereof, said selector lever means being manually movable to selected operating positions and to a selector lever null position, said selector lever means being effective upon being moved to and from said selected operating positions to actuate said switching elements and to thereby complete and open said related electrical circuit means, an actuator member operatively fixedly connected to said steering wheel means and rotatable therewith about the longitudinal axis of said steering gear housing means, a mounting body for said switch housing means, said mounting body having first mounting surface means adapted for operatively engaging the outer surface of said steering gear housing means, said mounting body having second mounting surface means generally opposite to said first mounting surface means for operatively engaging an outer surface of said switch housing means, an actuator lever situated totally externally of said switch housing means and pivotally carried by said mounting body, said actuator lever having a first arm portion positionable as to be engageable by said actuator member, said actuator lever being effective when engaged by said actuator member and when said selector lever is in one of said selected operating positions to operatively engage and forcibly move said selector lever from said one of said selected operating positions to said selector lever null position, and resilient means effective for at other times permitting said actuator member to be deflected by and pass past said first arm portion.

* * * * *